(12) United States Patent
Delmoro et al.

(10) Patent No.: US 6,786,800 B1
(45) Date of Patent: Sep. 7, 2004

(54) TIRE UNIFORMITY MACHINE GRINDSTONE

(75) Inventors: Richard L. Delmoro, Tallmadge, OH (US); David P. Krause, Hartville, OH (US); David Poling, Sr., Akron, OH (US)

(73) Assignee: Akron Special Machinery, Inc., Akron, OH (US)

( * ) Notice: Subject to any disclaimer, the term of this patent is extended or adjusted under 35 U.S.C. 154(b) by 163 days.

(21) Appl. No.: 09/939,545

(22) Filed: Aug. 27, 2001

Related U.S. Application Data

(63) Continuation-in-part of application No. 09/678,242, filed on Oct. 4, 2000.

(51) Int. Cl.[7] .................................................. B24B 5/00
(52) U.S. Cl. ........................... 451/11; 451/49; 451/65; 451/456; 51/106 R; 51/165 R; 51/DIG. 33
(58) Field of Search .................................. 451/11, 5, 49, 451/57, 65, 246, 254, 258, 456; 241/DIG. 31; 125/13.01, 14, 13.02, 15; 51/268, 106 R, 270, 272, 273, 174–177, 165 R, DIG. 33

(56) References Cited

U.S. PATENT DOCUMENTS

| | | | |
|---|---|---|---|
| 3,866,360 | * 2/1975 | Monajjem | 451/28 |
| 3,905,160 | * 9/1975 | McKenney | 451/28 |
| 4,041,647 | * 8/1977 | Ugo | 451/254 |
| 4,071,979 | * 2/1978 | Ugo | 451/254 |
| 4,669,228 | * 6/1987 | Rogers | 451/28 |
| 4,736,546 | * 4/1988 | Ugo | 451/254 |
| 5,099,613 | * 3/1992 | Rogers, Jr. | 451/24 |
| 5,167,215 | * 12/1992 | Harding, Jr. | 125/13.01 |
| 6,431,963 | * 8/2002 | Delmoro et al. | 451/49 |

* cited by examiner

Primary Examiner—Joseph J. Hail, III
Assistant Examiner—Anthony Ojini
(74) Attorney, Agent, or Firm—Renner, Kenner, Greive, Bobak, Taylor & Weber

(57) ABSTRACT

A grinder in a tire uniformity machine having a frame including a first side frame member and a second side frame member, the frame receiving a tire having a central axis for testing, the grinder including a carriage pivotally attached to the first side frame member and a locking assembly adjacent the carriage and the second side frame member selectively coupling the carriage to the second side frame member when the carriage is in the operating position; a grinding head supported on one end of the carriage, the grinding head having at least one grinding stone and at least one motor coupled to the grinding stone capable of causing rotation thereof.

26 Claims, 11 Drawing Sheets

TIRE UNIFORMITY MACHINE GRINDSTONE

RELATED PATENT APPLICATIONS

This application is a continuation-in-part of patent application Ser. No. 09/678,242, filed Oct. 4, 2000 entitled Dual Grindstone.

BACKGROUND OF THE INVENTION

In tire uniformity machines, a tire is tested by rotating it at various speeds to ensure that the tire has been constructed and performs within quality control standards. During this testing process, the tire is rotated and the tire uniformity machine examines the tire's shape and surface characteristics to a high degree of accuracy. At times, during examination, the tire uniformity machine detects irregularities in the tire. Any irregularity in the surface and shape of the tire may be corrected by removing material from appropriate portions of the tire.

To remove material, known tire uniformity machines typically employ a grinder having a single cylindrical grindstone rotating in relation to the rotation of the tire. As the tire rotates, the grindstone is selectively brought into contact with the tire to remove material.

In known grinders the application of the grindstone occurs in a rotary fashion. The typical grinder has a pivoting arm on which the grindstone and its motor are mounted. Often a motor and gear box arrangement is used to control the speed and direction of rotation of the grindstone. The motor is then connected to the grindstone or gearbox by belts or chains and a series of pulleys or sprockets. As will be appreciated, the motor needed to drive the series of belts or chains and the gear box are bulky and the available area for positioning of this unit is limited. In fact, the typical motor housing projects to such an extent that the confines of the tire uniformity machine prevent the grindstone from being actuated in a linear fashion. To overcome this, known tire uniformity machines attach the motor distally from the grinder on an arm that houses the drive belt or chain. In this way, the motor is located away from the instrumentation, the load wheel, and other devices that must be placed proximate to the test tire, where there is more space. The arm is mounted on a pivot such that the motor housing moves radially in a limited area. The pivot is located between the motor and grindstone, and the arm rotates under the force of a hydraulic cylinder attached to the arm on one side of the pivot. The typical hydraulic cylinder acts transversely of the arm and, thus, is mounted on a separate frame member than the frame member on which the arm pivots. So mounted, the hydraulic cylinders reduce visibility and access to the grinder and the area surrounding the grinder.

Due to the rotation of the arm, the grinder may not be aimed directly at the tire center. In other words, the center line and the contact point of the grinder travel in an arc in an attempt to tangentially contact the tire. As will be readily understood, initiating contact with the tire in this manner makes it difficult to make good, accurate contact in a repeatable manner. Further, the housing of the grinder must be adjusted to clear the machine housing and attempt to make proper contact between the grinder and the tire. Specifically, the grinder housing often is connected to a vacuum supply to remove particles created by the grinding process, and this housing must be made to closely fit about the grindstone. Since the housing closely fits about the grindstone, in these devices, simple rotation of the arm may cause the housing to contact the rotating tire. As will be appreciated, such contact could significantly damage the grinding apparatus and may cause damage to the tire.

To avoid such contact and to better position the grindstone to remove material, known devices adjust the position of the housing and grindstone by rotating the housing relative to the arm. To make this adjustment, known devices incorporate a series of linkages. In some cases, as many as five linkages may be used. Due to machining tolerances, each link is a potential source of error. When multiple links are used, this error is compounded making it more significant in terms of accurate removal of the tire material. These errors make it difficult to achieve good contact with the tire.

Also, when two grinding stones are used, it virtually eliminates the grinder's ability to have both stones strike the tire simultaneously; and some cases may cause one stone to be out of contact with the tire T. A second stone is often used in an attempt to remove a lip or other irregularities created by the leading stone, as described more completely below. When linkage errors result in the trailing stone not being in contact with the tire, the trailing stone is precluded from performing its corrective function.

In known grinders, the amount or rate of material removal from the tire is often measured as a function of the grind current of the single motor driving the stone or stones. In a two-stone apparatus, the grind current measurement, of the single motor, would not be able to provide information on the percentage of work done by each grinder, and thus, if one stone was completely out of contact, this condition would go undetected. Further, the components linking the motor to the grindstones including belts or chains introduce additional error into this measurement.

Turning to the removal of material from the tire, known devices typically employ a generally cylindrical grindstone that rotates about a central axis of rotation. As best shown in prior art FIG. 1, the radial profile of the cylindrical grindstone leaves a lip L at each break in the periphery of the tire at the leading side, with respect to grindstone rotation, of the tire elements E, where the grindstone has made contact. It is believed that the lip L is formed by the rotation of the grindstone. As the grindstone encounters tire elements E separated by breaks in periphery of the tire T, the radial force of the stone causes deformation of the tire element E in the radial direction. At the same time, the tangential force of the stone acting on the relatively weak, generally flexible tire element E causes the tire element E to bend in the direction of the grindstone's rotation. Thus, the leading portion of the tire element E is ground to a lesser extent because it has been deflected away from the grindstone. Once the element is past the grindstone, the deflected element returns to its resting position with an irregular profile, as shown in FIG. 2. This irregularity is often referred to as a lip L.

In a single stone apparatus, attempts have been made to remove the lip by reversing the rotation of the tire and grinding in the opposite direction. Unfortunately, the result of this reversal is a corresponding lip on the opposite side of the tire element. Dual grindstones were introduced as an attempt to use a second grindstone to remove the lip. As described above, the error introduced by linkages that adjust the position of the grinding head, however, interfered with proper contact of the grindstones resulting in incomplete removal of the lip L. Or, in cases where the second stone did not contact the tire, the lip L remained completely intact.

In either the single stone or dual stone apparatus, the pivoting attachment of the arms supporting the grindstones can be a source of inaccuracy when grinding the tire. As previously discussed, the grinder is typically mounted on an arm that is pivotally attached to one of the frame members such that the grinder is rotated into contact with the tire. Typically, when the grindstones are in contact with the tire, the arms supporting the grindstones and extending back to the pivot point extends at an angle from the pivot. Forces at the grindstones are transmitted along this arm to the pivot. As will be appreciated, the length of the arm proportionately increases the moments on the pivot created by these forces. Unless the pivot is made extremely rigid, these forces may cause the arm or the grind head itself to move such that the grinders do not remove the appropriate amount of material. To avoid inaccuracies caused by such movement, a more stable system for mounting the grinder is needed.

SUMMARY OF THE INVENTION

It is an object of the present invention to provide a more stable mounting assembly for a grinder in a tire uniformity machine.

It is a further object of the present invention to provide a grinder assembly having a motorized tilt adjuster.

In general the present invention provides a grinder in a tire uniformity machine having a frame including a first side frame member and a second side frame member, the frame receiving a tire having a central axis for testing, the grinder including a carriage pivotally attached to the first side frame member and a locking assembly adjacent the carriage and the second side frame member selectively coupling the carriage to the second side frame member when the carriage is in the operating position; a grinding head supported on one end of the carriage, said grinding head having at least one grinding stone and at least one motor coupled to the grinding stone capable of causing rotation thereof.

The present invention further provides a tilt adjustor in a tire uniformity machine that tests a tire having a circumference, the tire uniformity machine having a grinding head supported on an arm at a pivot and pivotable about a pivot axis extending through the pivot parallel to a tangent of the circumference of the tire, the tilt adjustor including a motor assembly supported on the arm and operatively coupled to the grinding head, whereby activation of the motor assembly causes the grinding head to pivot.

Accordingly, production of an improved tire uniformity grindstone of the character just described becomes the principal object of this invention, with other objects thereof becoming more apparent upon a reading of the following brief specification, considered and interpreted in view of the accompanying drawings.

BRIEF DESCRIPTION OF THE PREFERRED EMBODIMENTS

A grinder according to the present invention is generally referred to by the numeral 10 in the accompanying drawing figures. Grinder 10 is used to remove material from a tire T. Tire T is located in a tire uniformity apparatus (not shown) and accordingly is rotatably mounted, about a central axis CA, within the tire uniformity machine. During operation of the tire uniformity machine, tire T may be caused to rotate, by an appropriate drive mechanism, such that the tire T rotates about central axis CA. The tire uniformity machine causes the tire T to rotate to evaluate aspects of the tire T including its surface characteristics.

To that end, a load wheel is moved into and out of engagement with the periphery of the tire T and various sensors may be employed to obtain information about the tire's integrity, shape, and surface qualities. Irregularities in the surface S of tire T may be corrected by appropriate removal of material from the surface S. To remove material, grinder 10 is selectively brought into contact with the surface S of tire T.

Figure 4:
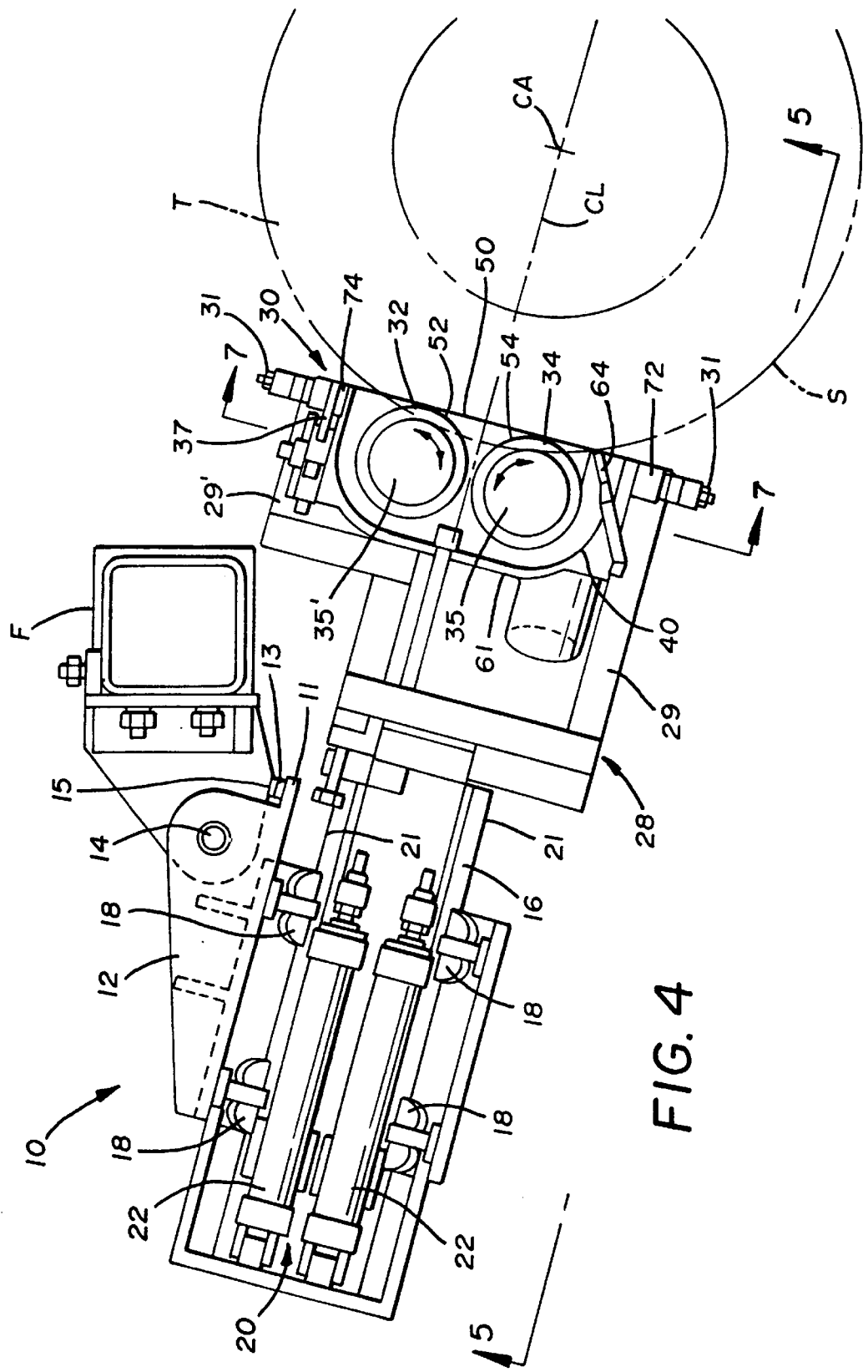
FIG. 4 is top plan view of a grinder in a tire uniformity machine according to the present invention.

Grinder 10 is suitably supported proximate to tire T to effect such contact, for example, by a frame F. Frame F may be an independent support or a part of the tire uniformity machine, as shown. Grinder 10 generally includes a carriage 12 attached to frame F. As shown in FIG. 4, carriage 12 may be provided with a pivot 14 to allow for radial adjustment of carriage 12 relative to the frame F. Pivoting of the carriage 12 allows the grinder 10 to be aligned with the tire to ensure proper contact between the grinder 10 and tire T. The center line CL of grinder 10 may be aligned with the central axis CA of tire T to achieve simultaneous contact of the dual grindstones of grinder 10.

Once aligned, the grinder 10 may be positively locked into place such that it remains aligned during the grinding process.

To that end, carriage 12 may be provided with a pivot stop 11 extending from support 12. Further, a bumper 13 and shim 15 may be provided between the frame and carriage 12 to adjust spacing. It will be appreciated that, adjustment shim 15 and bumper 13 may be located between the frame F and pivot stop 11. Thus, the radial position of carriage 12 may be adjusted by varying the size of the shim 15 and then the grinder 10 may be locked against frame F. Alternatively, a dynamic adjustment system may be used incorporating appropriate sensors for determining the position of the grinder 10 relative to the tire T and its center line CL and an appropriate actuator, responsive to the sensors, for changing the radial position of the grinder 10 by movement of carriage 12 relative to the frame F. In this way, the grinder 10 may be appropriately aligned with respect to the tire T. Preferably, the center line CL of grinder 10 will be aligned with the axis CA of the tire T.

Figure 5:
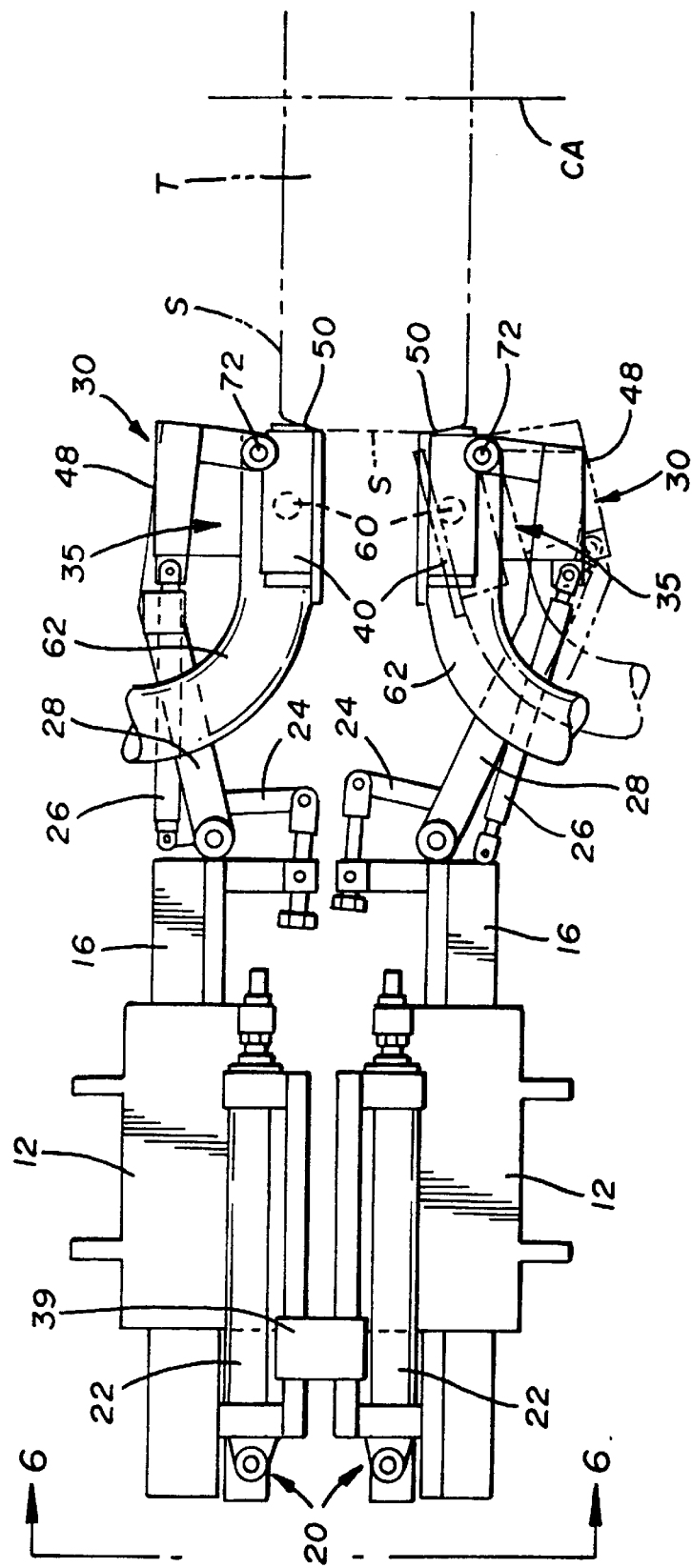
FIG. 5 is a front elevational view thereof.
Figure 6:
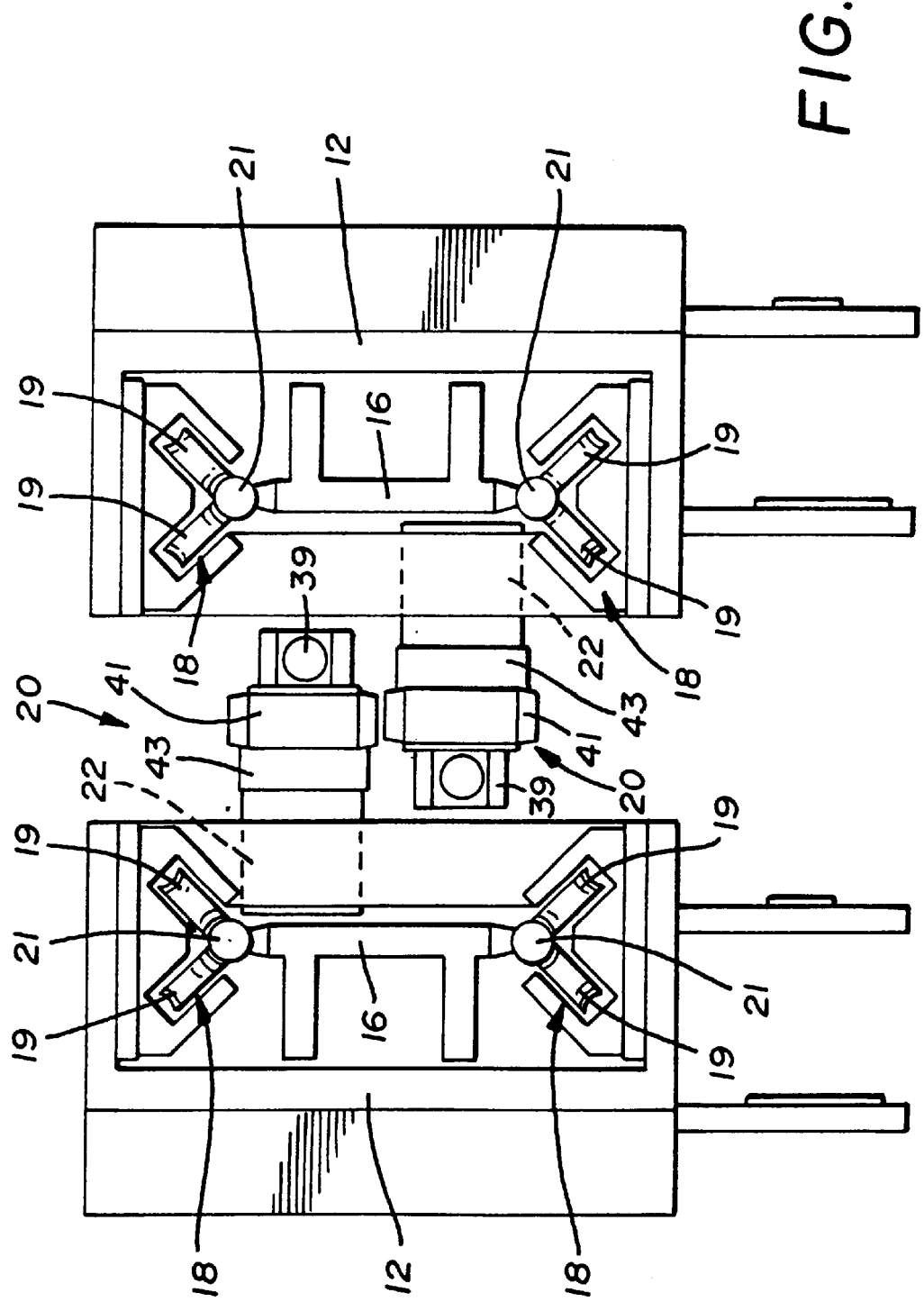
FIG. 6 is an end view of the grinders as might be seen along line 6—6 in FIG. 5.

One or more arms 16 are held in spaced relation by carriage 12. Arms 16 are supported on bearings 18 that facilitate substantially linear movement of the arms 16 toward and away from the tire T. Bearings 18, as shown in FIG. 6, are linear bearings and may include rollers 19 suitably mounted on carriage 12. Rollers 19 are vertically aligned to receive edges 21 of arms 16. Offset bearings 18, such as those shown in FIG. 6, may be employed and located at either side of the edges 21 of arm 16 to help resist forces acting on the arm 16 and maintain the position of the arm 16. Referring to FIGS. 4 and 5, bearings 18 may be located in fore and aft positions on the support member, and longitudinally aligned to guide the arm 16 upon actuation.

The arms 16 are actuated by a suitable linear actuator generally referred to by the numeral 20, including fluid driven actuators, such as, hydraulic or pneumatic cylinders, motor driven actuators, electric actuators and the like. In the embodiment shown, actuator 20 includes a pair of cylinders 22 that expand to drive the arms 16 toward tire T and retract to pull the arms 16 away from the tire T.

As previously discussed, the manipulation of grinder 10 may be controlled by various methods available in the art. For example, hydraulic or pneumatic cylinders 22 may be employed to extend and retract the arm 16 carrying grinding heads 30. In such a case, supply lines (not shown) carrying fluid from a fluid supply may used to selectively direct fluids to the cylinders 22 and to apply a motive force. The activation of these cylinders 22 may be coordinated by sensor 37 located in sensing relation to tire T or grinding head 30. The sensor 37 being in communication with a controller 39 that controls the fluid supply to the cylinders 22. In the embodiment shown, a servo valve 41 is used to control the flow of fluid passing through a manifold 43 that supplies the cylinders 22. As a result of the flow control, position of the grinding head 30 relative to the tire T is controlled.

Additionally, the position of grinding heads 30 relative to each other and tire T may be adjusted as required by the particular tire T. To that end, arms 16 are provided with a separation adjuster 24 and a tilt adjuster 26 engaging ends 28 of arms 16. The ends 28 may be made pivotable to allow spacing of grinding heads 30 relative to each other or arms 16. To provide further manipulation of grinding head 30, grinding head 30 may be pivotally attached to ends 28 of arms 16. As best shown in FIG. 4, grinding head 30 may be pivotally mounted between spaced members 29 of ends 28 and rotate or tilt therebetween, as described more completely below. While the grinder 10 may be oriented in any position and the tilting may be varied accordingly, the grindstone 32 substantially lies in a plane parallel to the plane of the tire T.

When the grindstone 32 is tilted, the grindstone 32 deviates from this plane and generally rotates between a plane substantially parallel to that of the tire T to a plane substantially perpendicular to that of the tire T. As can be appreciated, the amount of tilt may be limited by appropriate stops or limiters, and the tilt adjuster 26 may control the amount and rate of tilt. Tilt adjuster 26 extends from arm 16 or end 28 to grinding head 30 to control the amount of tilt of grinding head 30. To limit the range of motion of grinding head 30, an adjustable pivot lock 31 may engage grinding head 30. In this way, the adjustment members 24, 26 may be used to alter the spacing of grinding head 30, or to tilt the grinding heads 30 relative to the tire T and arms 16. Various adjustment members 24, 26 may be used including mechanical actuators such as threaded members, gears, ratchet members, fluid cylinders, or cams; or electric actuators including linear rails. Alternatively, spacing and tilt may be adjusted by moving the grinding heads 30 on the frame F, arm 16 or carriage 12.

Grinding heads 30 are supported on ends 28 of arms 16. Ends 28 may include a pair of spaced members 29 that receive grinding head 30 therebetween. Grinding heads 30 generally include a pair of grindstones 32, 34 driven by at least one motor 35. As shown in FIG. 4, each grindstone 32, 34 may be driven directly by a motor 35, 35' located adjacent each grindstone 32, 34. The motor 35 is supported adjacent to grindstones 32, 34 and may be mounted to the ends 28 of arms 16 or to shroud 40 itself. The grindstones 32, 34 are operatively attached to the motor 35 and may be driven directly thereby. Each grindstone 32, 34 may be operated by its own individual motor 35. By using a single motor 35 for each grindstone 32, 34, the size of motors 35, 35' are reduced. Directly driving each grindstone 32, 34 may further reduce motor size in comparison to known systems that require a pulley or sprocket drive assembly. Further, the grind current and, thus, the operation of each grindstone may be measured for each motor to give a percentage representation of the work done by each motor.

When the grindstones 32, 34 are driven directly, the inertia of the drive system is reduced in comparison to known systems incorporating a large motor located distally from the grindstones with a series of belts or chains connecting the motor to a gear box that controls the direction of the stones. The reduced inertia of a directly driven system improves the rate and initiation of a reversal of the grindstones 32, 34. By reversing the grindstones 32, 34 quickly the directly driven system may significantly reduce processing time when reversal is necessary.

Figure 7:
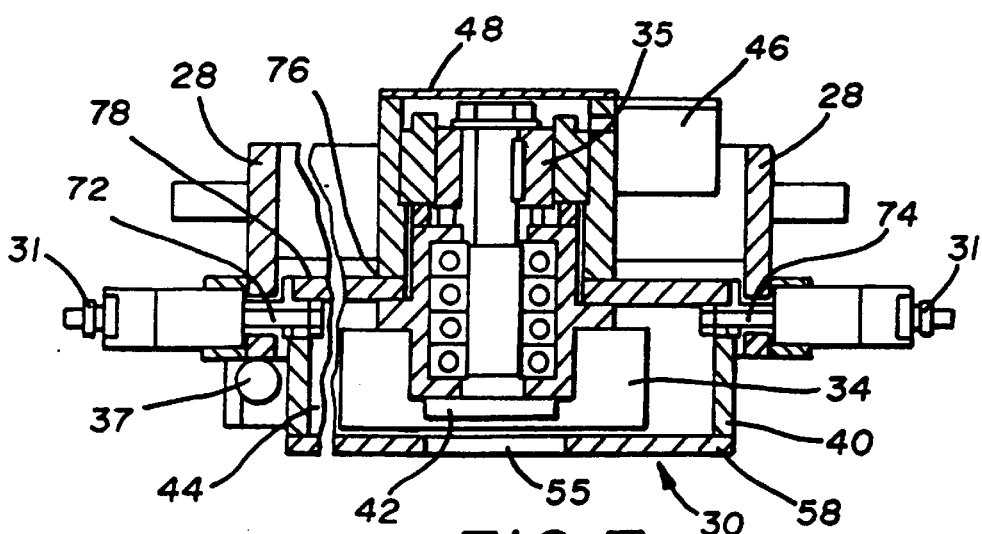
FIG. 7 is a cross sectional view of the grinders as might be seen along line 7—7 in FIG. 4.

As best shown in FIG. 7, the motor 35 may be secured adjacent to the shroud 40. The shaft 42 of motor 35 extends through an opening formed within the shroud and extends into the grinding chamber 44, defined by the shroud 40, where it is coupled to the grindstone 32, 34. Power to the motor 35 is supplied conventionally by cables and may connect to the motor 35 at a junction box 46. To protect the components of motor 35, a housing 48 is provided to substantially cover the exposed surfaces of motor 35. To help contain and remove these particles, the shroud 40 closely fits over grindstones 32, 34. The shroud 40 may generally define an opening 50 located radially outwardly from the axis of rotation of grindstones 32, 34 and spaced therefrom such that the grinding surfaces 52, 54 of grindstones 32, 34 are exposed. Further, shroud 40 may define an opening 55 axially spaced from the grindstones 32, 34 to allow access to the interior 44 of shroud 40 for purposes of cleaning or to repair or replace the grindstones 32, 34. During operation, the axially spaced opening 55 may be closed by a suitable cover 58.

The shroud 40 may be provided with a nozzle 60 attached to a vacuum source open to the interior of the shroud 40 for the removal of particulate created during the grinding process. When the shroud 40 has a curved wall 61, as shown in FIG. 4, the nozzle 60 may open into chamber 44 tangentially, as best shown in FIG. 5. A nozzle 60 may be integrally formed with shroud 40 and is fluidly connected to the vacuum source by a hose 62. To further aid in the removal of particulate, a jet nozzle 64 may direct a supply of fluid, such as air, toward the tire T to attempt to expel particulate lodged within the treads of tire T or on the surface S thereof. Jet 64 is fluidly connected to a supply distal from the grindstone 32. Jet 64 may be located outside of or within shroud 40.

Preferably, jet 64 is located near the tire T and may be positioned such that it is centrally located within the vacuum stream created by the vacuum source, as discussed in the copending application referred to above.

The shroud 40 is open toward the tire T exposing a portion of the grindstones 32, 34 to the tire T. The sensor 37 may be mounted on the shroud 40 or proximate thereto to determine the amount of material removed from the tire T. Sensor 37 communicates with controller 39 which accordingly controls the movement of grindstones 32, 34.

Figure 1:
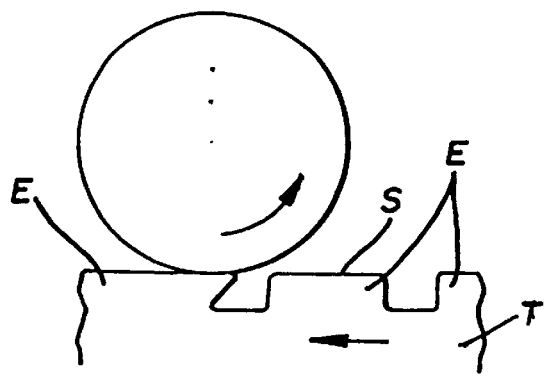
FIG. 1 is a prior art figure schematically depicting the lip formed by a typical single stone grinder.
Figure 2:
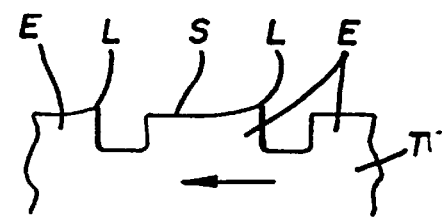
FIG. 2 is a schematic side elevational view of a tire depicting the lip left by a prior art grinder.
Figure 3:
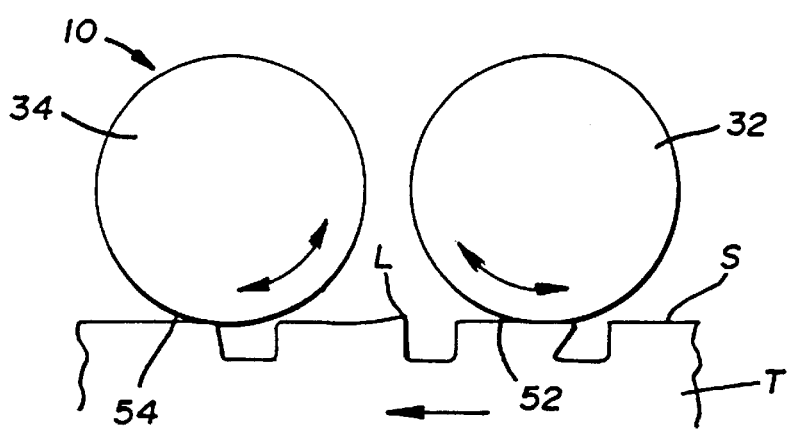
FIG. 3 is a schematic view of a grinder according to the present invention depicting removal of material from the tire.

When removing material from the tire T, contact is made by leading grindstone 32 relative to the rotation of the tire T and the trailing grindstone 34, located behind leading grindstone 32, contacts the tire T slightly thereafter. The grindstones 32, 34 may rotate in the same direction about their respective axes of rotation or they may rotate in opposite directions with respect to each other. For example, as shown in FIG. 2, the leading grindstone 32 may rotate in a clockwise direction and the trailing grindstone in a counterclockwise direction. Depending on the particular tire T, the rotation of grindstones 32, 34 may be altered relative to the direction of rotation of tire T. For example, each grindstone 32, 34 may have its own motor 35 with each motor driving the grindstone 32, 34 in either a clockwise or counterclockwise direction. Alternatively, belts, gears, or other known means may be used to drive and control the direction of rotation of both grindstones 32, 34 when a single motor is used.

As previously discussed, the position of the arms 16 and thus the grinding heads 30 may be controlled by selectively extending or retracting the arms by way of the linear actuator 20. Extension of the arms 16 may be used to simultaneously place both grindstones 32, 34 of the grinding head into contact with surface S of tire T. In this way, the grinding head 30 is directly driven by a single actuator 20 into contact with the tire T. Once in contact, the leading and trailing grindstones 32, 34 remove material from the tire T in consecutive fashion. The leading grindstone 32 may remove the bulk of the material with the trailing grindstone 34 removing any lip L or irregularity left by the leading grindstone 32. Once sufficient material is removed from the tire T, the linear actuator 20 retracts the arm 16 pulling the grindstones 32, 34 away from the tire T. If the axes of the grindstones are laterally aligned with respect to each other, the grindstones 32, 34 are generally withdrawn from the surface S of tire T at the same time.

Since grinding may occur at the treads, sidewall, or the shoulder therebetween, the grinding head including the shroud 40 and motor 35 may be made pivotable about an axis 70. In the embodiment shown, the end 28 of the arm 16 attaches to the shroud 40 of grinding head 30 at a pair of pivot points 72, 74 located on either side of the shroud 40.

As shown in FIG. 5, the pivot points 72, 74 may be located generally near the base 76 of the motor 35 and in substantial alignment with the top portion 78 of the shroud 40. A tilt adjuster 80 may extend between the arm 16 and the housing of the motor 35, wherein displacement of the tilt adjuster 26 pivots the grinding head 30 about the axis 70 defined by pivot points 72, 74. In this way, the grindstones 32, 34 may be rotated to contact the sidewall, shoulder, or tread in substantially parallel relation to the surfaces if desired. It will be appreciated that depending on the type of irregularity that is to be removed from the tire T, the grinding surfaces 52, 54 of the grindstones 32, 34 may be positioned at various angles with tilt adjuster 80.

It may be desirable to obtain different surface characteristics for different tires T or portions thereof. Consequently, differing grinding treatment of tires T may be required as various tires T are tested at the tire uniformity machine. To accommodate the variance in tires T, the speed and direction of rotation of grindstones 32, 34 in general and relative to each other may be varied either through controlling the speed of the motors 35, or through the use of other known means including pulley or gear differentials. Alternatively, grindstones 32, 34 having a different grit may be selected to obtain a desired surface characteristic.

It will still further be appreciated that the grinding head 30 and motor head 35 may be retrofit to existing grinders with little or no modification.

An alternative grinder, generally referred to by the numeral 110 is depicted in FIGS. 8–11A. Grinder 110 includes an arm 116 having an end 128, which includes a pair of spaced members 129 pivotally attached to the arm 116 at a pivot point. A grinding head 130 is generally located between members 129, 129 and pivotally supported thereon. Each member 129 having a pivot 172, such as pins 171, at which the head 130 attaches, defining a pivot axis 170 on which the grinding head 130 rotates.

Tilt of the grinding head 130 may be effected in a motorized fashion through the use of a motorized tilt adjuster 180. Tilt adjuster 180 is coupled to the grinding head 130 or pivots 172 to urge grinding head 130 to rotate about axis 170.

To that end, tilt adjuster 180 includes a motor assembly generally indicated by the numeral 185. Motor assembly 185 includes a motor 186 having a shaft 188 which may be directly coupled to the grinding head 130. In such a situation motor 186 might be located on the grinding head 130 or member 129 at either pivot 172.

Figure 8:
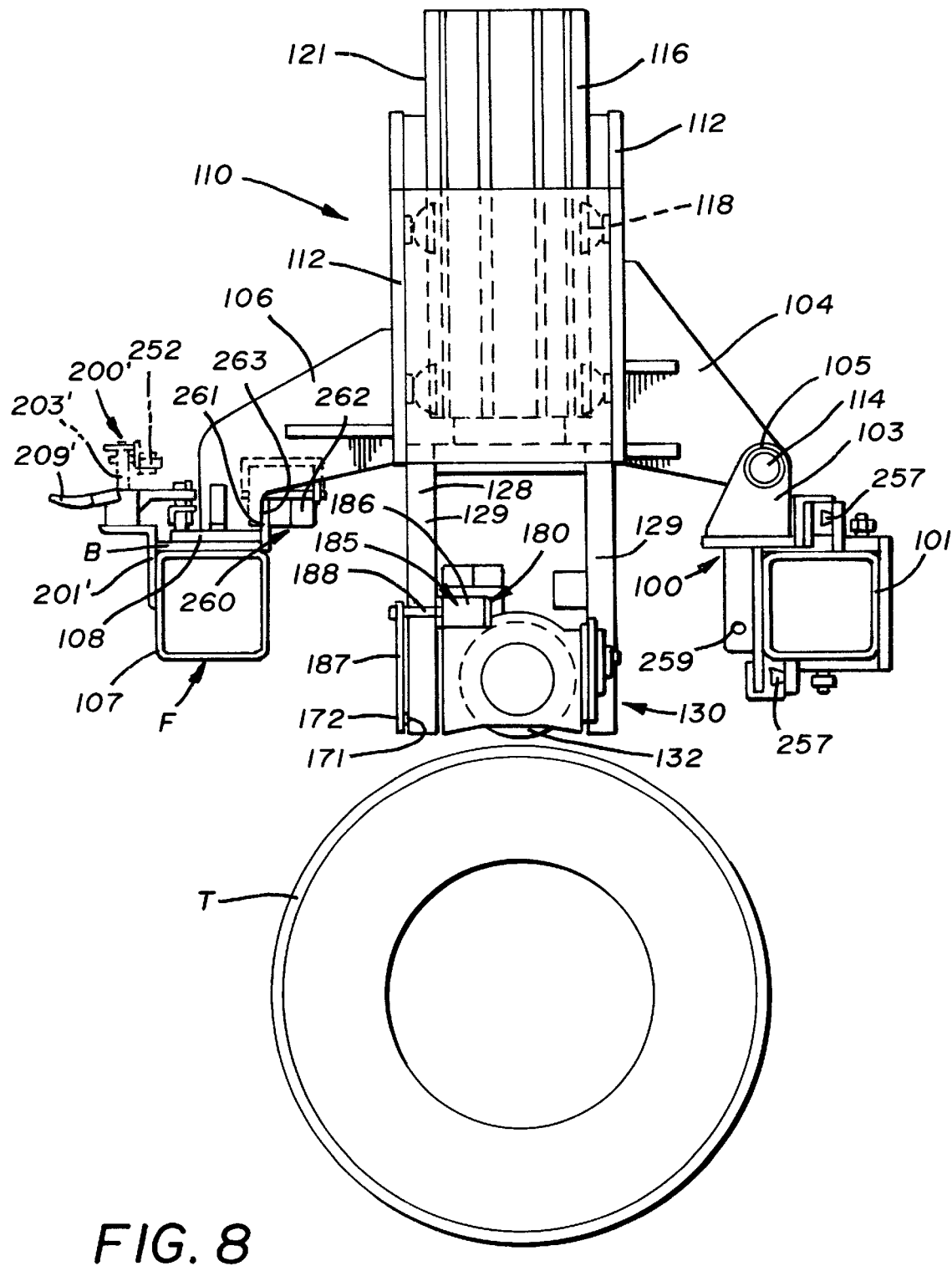
FIG. 8 is a top plan view of one grinder according to the present invention depicting a grinder having a single grindstone supported on a pair of frame members.
Figure 9:
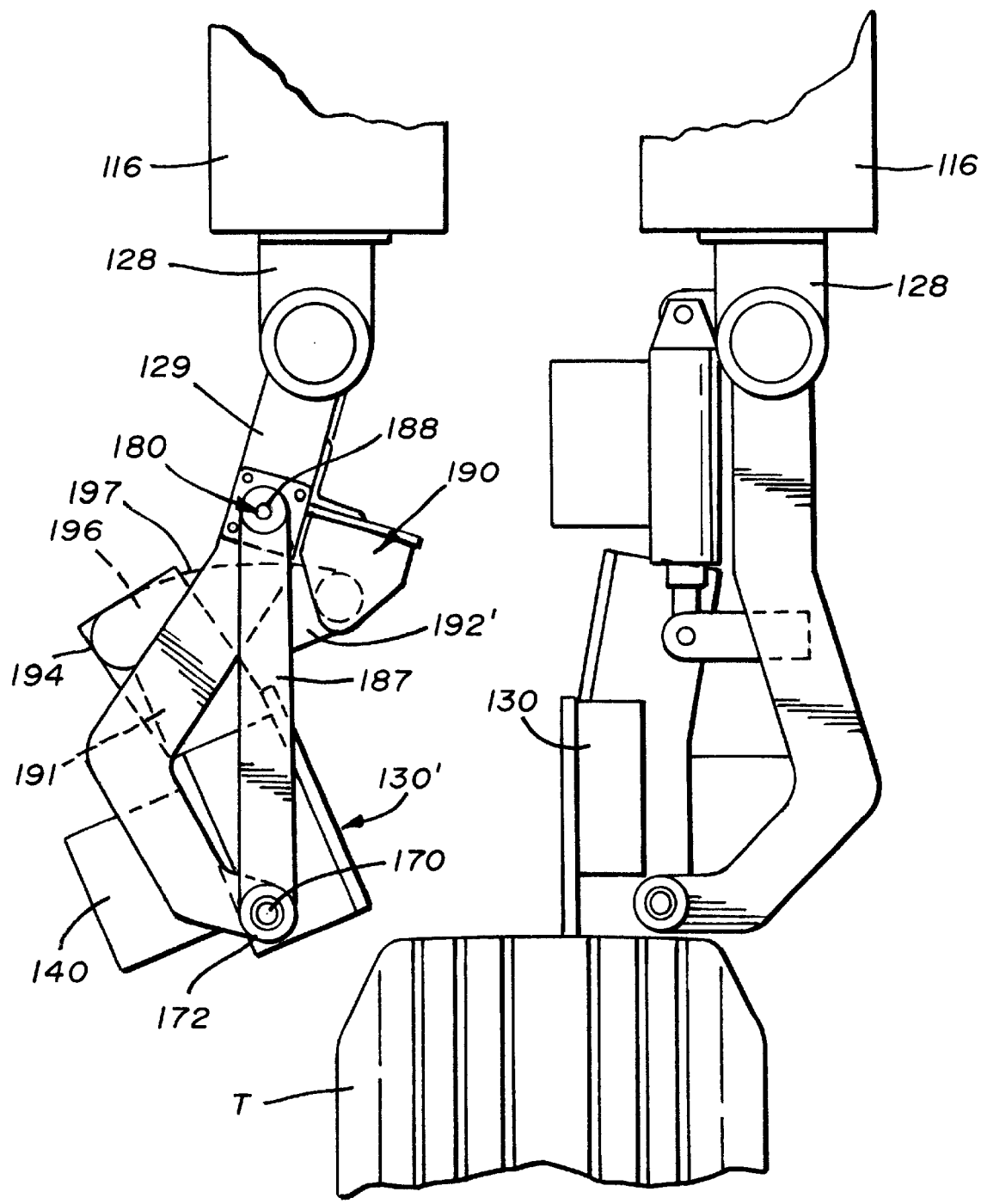
FIG. 9 is an enlarged fragmentary side elevational view of a grinder similar to the grinder depicted in FIG. 8A depicting the end of the grinder, its grinding head, and a tilt adjuster assembly that pivots the grinding head.
Figure 10:
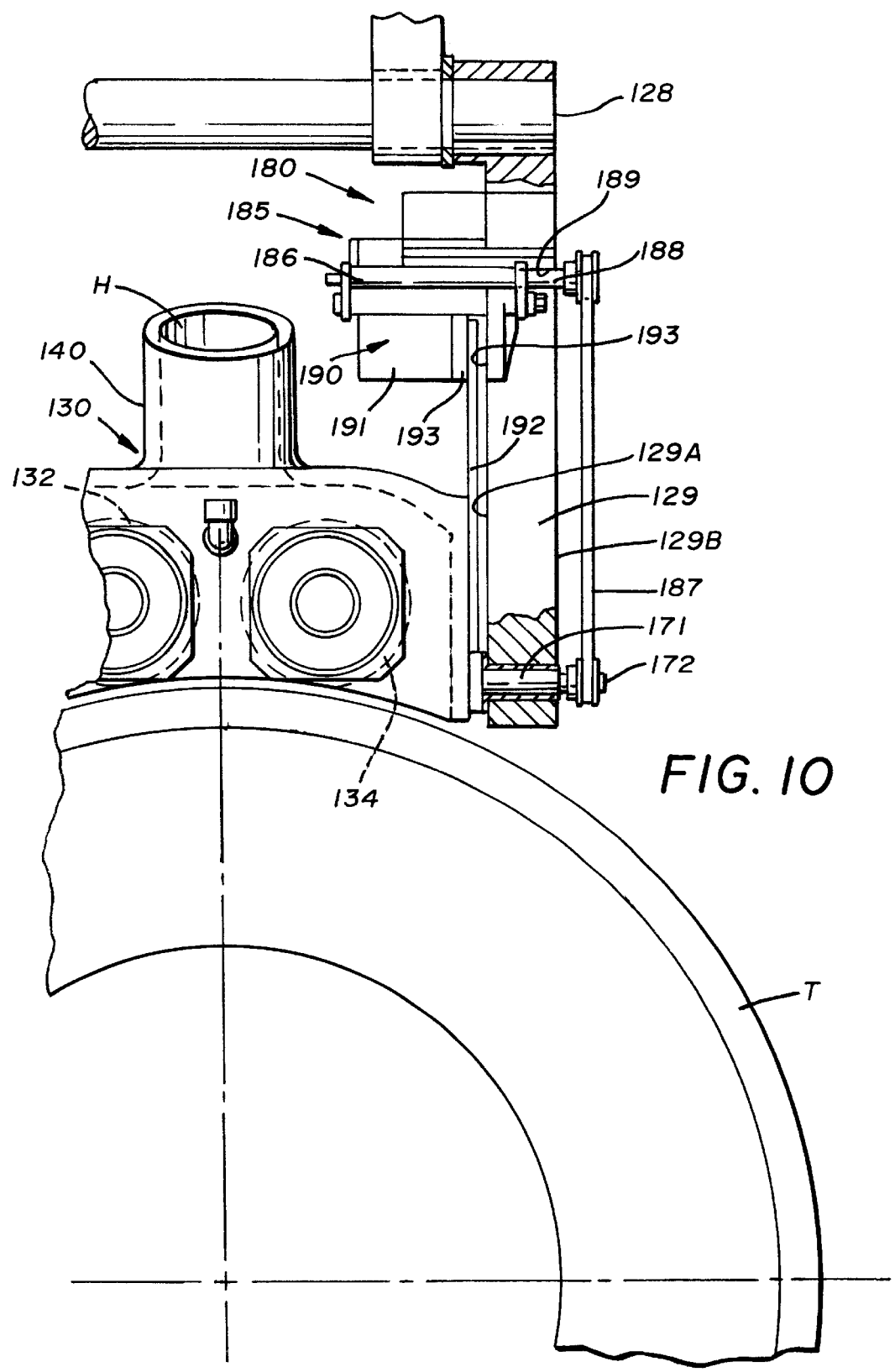
FIG. 10 is a partially fragmentary partially cut away top plan view of a tire and grinder, similar to the one depicted in FIG. 9, depicting more details of the grinding head and tilt adjustment assembly.

Alternatively, as shown in FIGS. 8 and 10 the motor 186 may be placed distally of pivot 172 and coupled to the grinding head 130 by a coupler 187, which may include a suitable linkage, cam, chain or belt. The coupler 187 allows the motor 186 to be placed at virtually any location within the tire uniformity machine. When using a belt, routing of the belt may conventionally be managed by various wheels or pulleys. As shown in FIG. 9, a belt may extend between pulleys mounted on pin 171 and a motor shaft 188.

As previously mentioned, motor assembly 185 may be mounted at generally any location within the tire uniformity machine 10 with attention to surrounding components and the movement of grinding head 130. One suitable location is on arm 116. As shown in FIG. 10, the motor 186 may be located on the end 128 of arm 116. As shown, motor 186 is mounted on one of the members 129, which support grinding head 130. Motor 186 may be mounted between members 129 rearward of grinding head 130 to avoid interference with the movement of the grinding head 130. To avoid interference with a vacuum hose extending from the grinding head 130, the motor assembly may be mounted below or radially outward of the hose's path H.

In the embodiment shown in FIG. 10, motor 186 is mounted on the inside surface 129A of member 129 and spaced-rearwardly of grinding head 130. Since the members 129 are spaced to a greater extent than the walls of a vacuum hose, the motor 186 should not interfere with the hose.

To accommodate interior placement of motor 186, while coupling the motor 186 to grinding head 130 externally of member 129, member 129 may be provided with a shaft bore 189 that allows the motor shaft 188 to extend beyond the outside surface 129B of member 129. As shown in FIG. 10, with motor shaft 188 and pin 171 extending externally of the outside surface 129B, coupler 187 may be mounted between the shaft 188 and pin 171 to effect coupling of the motor 186 to the grinding head 130, whereby rotation of the motor shaft 188 would cause proportionate tilting of the grinding head 130. As will be readily understood, the proportion of movement may be controlled by the selection of the coupler 187 or by varying the diameter of shafts, pins or pulleys when a belt OIL similar coupler 187 is used.

Once the grinding head 130 has been urged to a desired position it may be held in that position by the motor 186 or a suitable braking assembly. One braking assembly, generally referred to by the numeral 190, includes a brake 191. Brake 191 may be located adjacent the grinding head 130 or pivots 172, 174 to directly apply braking force to hold the head 130 in place. To gain mechanical advantage, brake 191 may be placed distally of the pivot axis 170 applying its braking force along a lever arm created by a brake member 192.

Brake member 192 may be secured to grinding head 130 and extend from the grinding head 130 toward the brake 191. In the embodiment shown, brake member 192 attaches to the side of shroud 140 and extends rearwardly from the grinding head 130 to lie between pad 193 of brake 191. When the brake 191 does not move with the tilting of head 130, such as when attached to an object that is stationary with respect to the grinding head 130, for example, arm 116 or member 129, brake member 192 may be provided with an extension 194 that lies in a position where the brake 191 may apply force to member 192 as the head 130 tilts. To that end, an extension 194 extends outward from brake member 192 to provide a surface 196 on which the brake 191 can act. It will be appreciated that the extension 194 does not have to be continuous and may simply provide a number of tabs corresponding to set positions.

In the embodiment shown, extension 194 and brake member 192 combine to define a somewhat hatchet-shaped member with a continuous arcuate distal edge 197. The continuous nature of edge 197 of extension 194 provides an infinite number of points along extension 194 to which braking force may be applied. Arcuate edge 197 is formed along a constant radius from axis 170 providing clearance for rotation of extension 194 relative to axis 170 between pads 193. The arc length of edge 197 is determined by the desired range of motion for grinding head 130, or, in other words, the desired degree of tilt. As will be appreciated, with the extension 194 lying between pads 193 throughout the range of motion of grinding head 130, the grinding head 130 may be held in place at any point therein by application of a braking force to the brake member 192.

It will be appreciated that brake assembly 190 may be placed at virtually any location with suitable routing of brake member 192. As shown, brake 191 is located adjacent motor 186 on the inside 129A of member 129. For convenient attachment of brake member 192 to grinding head 130, pads 193 and brake member 192 are located such that the space 195 between pads 193 lies in the same plane as brake member 192. In this way brake member 192 passes freely as it rotates with grinding head 130.

In operation, grinding head 130 may lie in a resting position, shown in solid lines. By activating motor assembly 185, grinding head 130 may be moved to a tilted position, such as, position 130'. To hold the grinding head 130 in the resting position or a tilted position, the braking assembly 190 may apply a braking force directly to grinding head 130 or to the brake member 192. When using a brake member 192 that is attached to the grinding head 130, brake 191 applies braking force to the brake member 192. In the embodiment shown having the brake member 192 directly attached to grinding head 130, tilting of the grinding head 130 to tilted position 130' causes the brake member 192 to rotate to a tilted position 192' as well. As the brake member 192 rotates extension 194 continues to be located between pads 193 allowing application of braking force thereto. Thus, when grinding head 130 reaches the appropriate position pads 193 may grip extension 194 to hold the extension 194 and grinding head 130 in a selected position. In this way, grinding head 130 may be tilted and held in a number of positions by tilt adjuster 180.

Since members 129 at the end 128 of arm 116 are also pivotally attached, a similar motor assembly and brake assembly may be used to adjust the spacing between opposed grinding heads 130, 130. In either case, the amount of tilt or spacing of grinding head 130 for a given tire may be automated by connecting these assemblies to the controller C of the tire uniformity machine. The controller C may command motor assembly 185 to adjust tilt and spacing and this adjustment may be automated by using feedback from the various sensors in the tire uniformity machine to ensure proper positing is obtained.

As previously described, the grinder 110 may be supported on a frame F.

As in the previous embodiment, grinder 110 may be tied to frame F as by a carriage 112. Carriage 112 may be provided with a pivot 114 to which the grinder 110 is pivotally coupled to facilitate access to the components of grinder 110. For example, when grindstones 132, 134 need replacement, the grinder 110 may be pivoted away from the tire T about pivot 114 to provide access to the stones 132, 134.

Figure 8A:
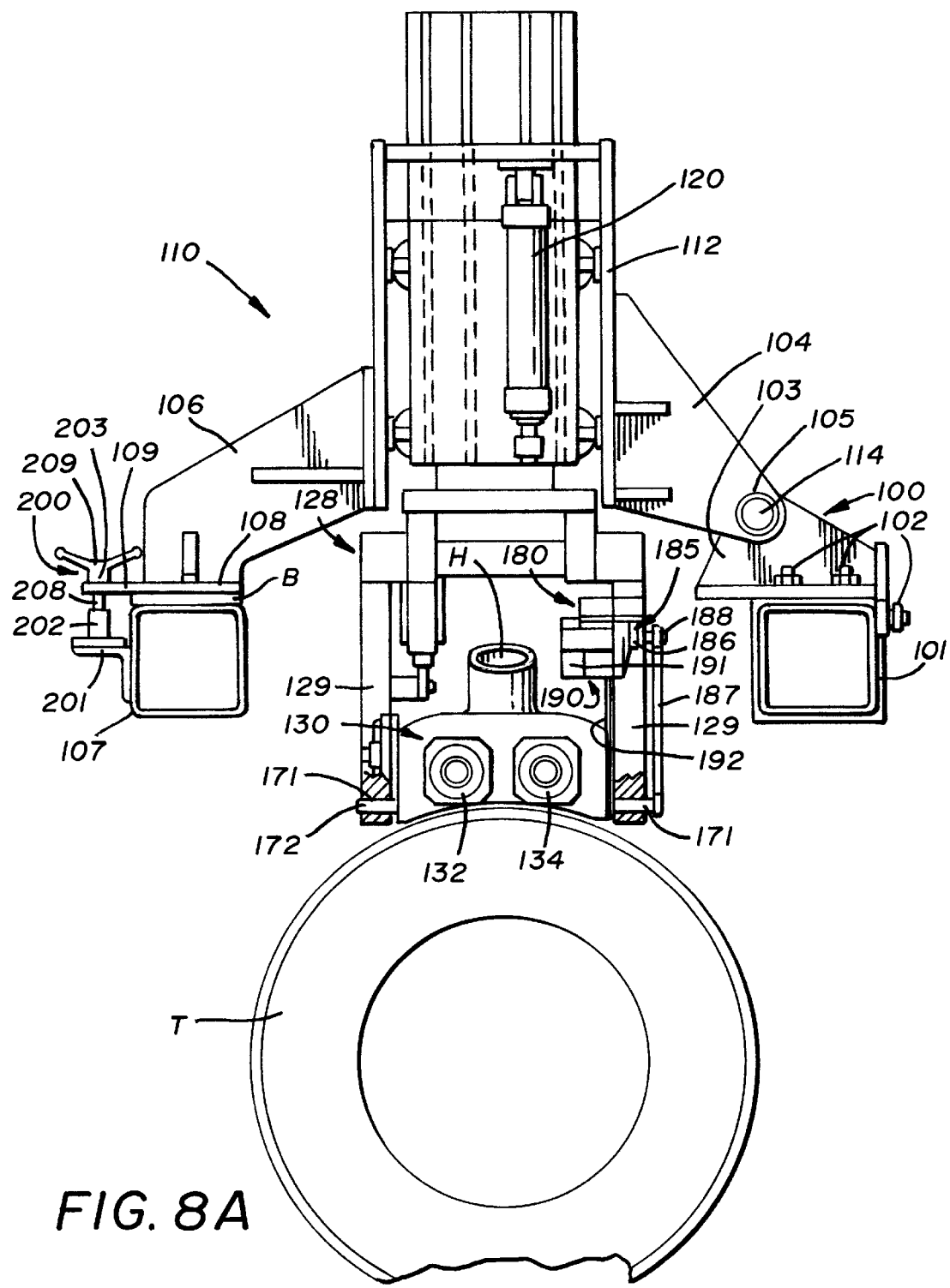
FIG. 8A is a top plan view of one grinder according to the present invention depicting a grinder having two grindstones supported on a pair of frame members.

To maintain the ability to access grindstones 132, 134, and improve the stability of the grinder 110, an alternate support system may be used. For example, grinder 110 may be coupled to a tire uniformity machine 110 at more than a single point. As shown in FIG. 8A, a support assembly 100 attaches to a first frame member 101, as by bolts 102 and is provided with a pivot 103 to which the carriage 112 is rotationally coupled. Carriage 112 may be provided with a first support portion 104 having pivot 114 at an end 105 thereof, which attaches to the carriage 112 to a pivot member 103 extending from or attached to frame member 101 creating a first point of coupling for grinder 110. A second support portion 106 extends opposite first support portion 104 from carriage 112 toward a second frame member 107. The second support portion 106 provides an additional point of attachment, which may be made releasably to allow pivoting of the grinder 110, as described above. To that end, second support portion 106 is provided with a stop portion 108, which may include a bumper B for contacting second frame member 107. Stop portion 108 may be provided with an extended portion 109, which extends beyond the outside surface of second frame member 107, to provide an additional surface for attaching the carriage 112 to the second frame member 107 by a suitable locking assembly as described below.

Any number of available assemblies may be used to clamp or otherwise couple the stop portion 108 of second support 106 to second frame member 107. The second support 106 may be directly attached to the frame F as by bolts, in a manner similar to support assembly 100. As shown in FIGS. 8, 8A, 11, 11A and 12, a locking assembly may be employed for this purpose. One locking assembly, generally referred to by the numeral 200, may include a bracket 201 attached to the frame member 107 as by welds or fasteners having a receiver 202. A locking member 203 carried by the second support portion 106 operatively engages the receiver 202 to couple the second support 106 portion and second frame member 107 together.

Figure 11:
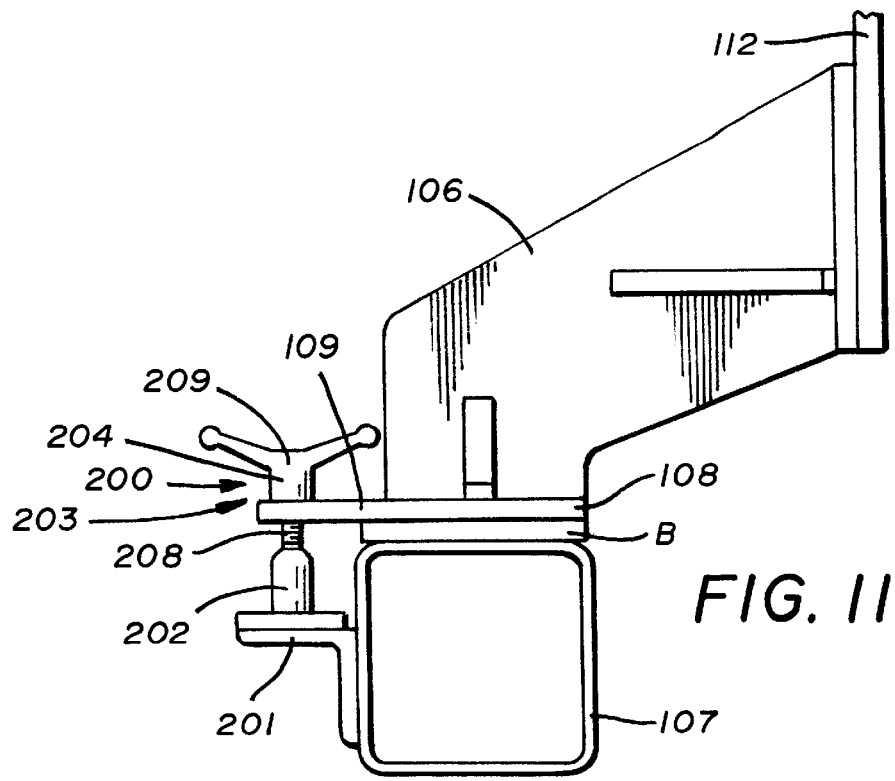
FIG. 11 is a partially fragmentary enlarged top plan view of a first embodiment of a grinder according to the present invention depicting a frame member of a tire uniformity machine, a portion of the carriage of the grinder, and a threaded locking assembly used to secure the frame member to the carriage.

In one embodiment, depicted in FIG. 11, the locking member 203 includes a threaded portion 208. In this locking assembly 200, once the second support portion 106 is brought into engagement with the frame member 107, it is locked in place by threading locking member 203 into receiver 202. Locking member 203 may be provided with a clamp portion 204 that bears upon the stop 108 such that threading of the locking member 203 into receiver 202 applies a clamping force between the stop 108 and receiver 202 that acts to lock the second support portion 106 to the frame member 107. To facilitate application of the clamping forces, by means of the threaded locking member 203, locking member 203 may be provided with a handle portion 209 that extends radially outwardly of the threaded portion 208 to provide greater mechanical advantage. It will be appreciated that other locking assemblies may be used in the same fashion including a C-clamp. To facilitate this type of attachment, Stop 108 may be provided with an extended portion 109 that extends beyond a plane defined by the sides of the second frame member 107, and bracket 201 may be attached to the side of the frame member opposite the extended portion 109 of the stop 108 such that clamping forces are applied between the bracket 201 and the extended portion 109 of the stop 108.

Figure 11A:
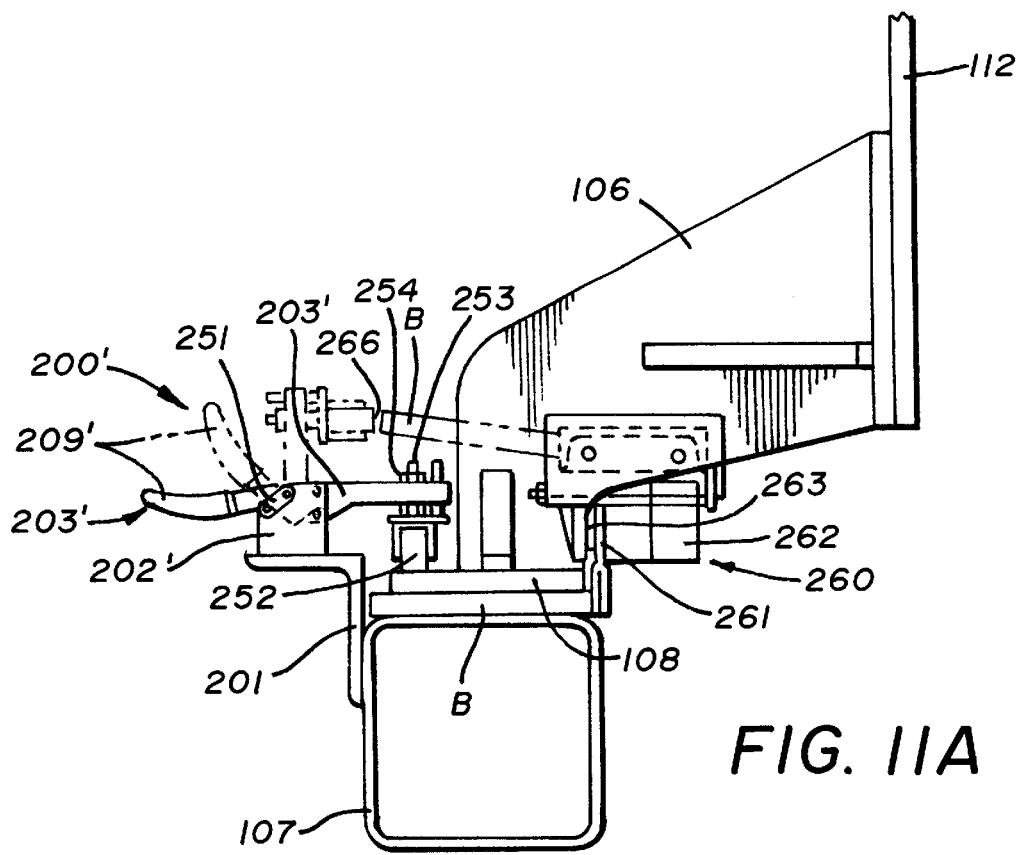
FIG. 11A is a partially fragmentary enlarged top plan view of a second embodiment of a grinder according to the present invention depicting a frame member of a tire uniformity machine, a portion of the carriage of the grinder, and a latch type locking assembly used to secure the frame member to the carriage.

An alternative locking assembly 200' is shown in FIG. 11A. Like locking assembly 200, locking assembly 200' includes a bracket 201 attached to the second frame member 107. The alternative locking assembly 200' generally is a latch-type assembly. In this case, however, the locking member 203' is an arm 250 used to apply a clamping force to stop 108. Locking member 203' includes a handle portion 209', arm 250 and a linkage 251 interposed between the arm 250 and handle portion 209'. Operation of handle portion 209' causes the linkage 251 to act in a cam follower type fashion rotating the arm 250 into contact with stop 108 to apply a clamping force thereto. In the embodiment shown in FIG. 11A, arm 250 is provided with a caster 252 suitable supported on locking member 203', as by a bolt 253 and nut 254. In this way, the clamping force is applied via locking member 203' through caster 252. Caster 252 may permit vertical adjustment of the grinder 110 while the locking assembly 200' is engaged. As best shown in FIG. 8, the first support portion 104 may slidable engage the first frame member 101, as by having a sleeve configuration or by a rail assembly 257, such as THK rails, to allow such vertical adjustment of the grinder 110. Vertical adjustment of grinder 110 may be made manually or automatically. For automatic adjustment, an actuator 258, such as a linear actuator or electric or pressurized cylinder may act on carriage 112 to raise and lower grinder 110. As shown in FIG. 8, a cylinder, schematically depicted as a circle, engages a portion 259 of carriage 112 adjacent first side frame member 101. Cylinder 259 acts vertically to adjust the position of grinder 110, and may continuously adjust this position based on feedback from controller C. A brake assembly, generally indicated by the numeral 260, may be employed to retain the grinder 110 in the desired vertical position. To facilitate use of the brake assembly 260, a vertically oriented member 261 may extend outwardly from a frame member, such as second frame member 107, to interact with the brake assembly 260. In generally, brake assembly 260 includes a brake 262 having a receiver 263 through which the vertical member 261 may pass and brake pads adjacent the receivers 263 to apply a braking force to the vertical member 261. While, as shown in FIG. 8, the brake 262 may be supported on the grinder 110 such as at second support 106, it will be appreciated that the positions of brake 262 and vertical member 261 could be reversed. In this instance, the grinder 110 would receive braking force to hold it in place. To provide additional safety, a fail safe brake assembly 260 may be used. For example, a pneumatic or hydraulic brake 262 could be used having pads that are engaged when a zero pressure condition exists within brake 262. Thus, if the system lost pressure, the brake 262 would be engaged and the grinder would be held in place. To release the brake, pressure would be applied from a suitable source, such as an initiator, which may be supported on the frame F or grinder 110 and fluidly connected to brake 262.

In terms of operation, the brake assembly 260 would have to be released before vertical adjustment of the grinder 110 may be made or before the grinder 110 is swung out about pivot 114. It will be appreciated that the clamping force applied by lock assembly 200' would have to be removed before the grinder 110 could be swung out. As best shown in FIG. 11A, when the lock assembly 200' is released to the disengaged position (shown in broken lines) the locking member 203' and caster 252 are rotated away from second support 106 to provide clearance for the rotation of grinder about pivot 104. Specifically, the caster 252 is rotated away from second support 106 such that the bumper 109 clears the caster 252 as the grinder is pivoted about pivot 104, such as when changing grindstones 32, 34.

As will be appreciated, with the first and second support portions 104, 106 coupled to the first and second frame members 101, 107 the grinder 110 is supported on the frame F with greater stability. Further, by attaching to the first and second side frame members 101, 107 the grinder 110 may be centered between the frame members 101, 107 grinding head 130 may be driven directly toward the tire T along a line L located centrally relative to the frame members 101, 107 passing through the center axis CA of tire T. In this way, the grinding head 130 may be driven linearly toward the tire improving the ability of each grindstone to contact the tire T at substantially the same time. Any adjustment to the grinder's line of attach may be made by adjusting the locking assembly 200, or by inserting shims between the frame members 101, 107 and the support assembly 100 and stop 108 respectively.

Figure 12:
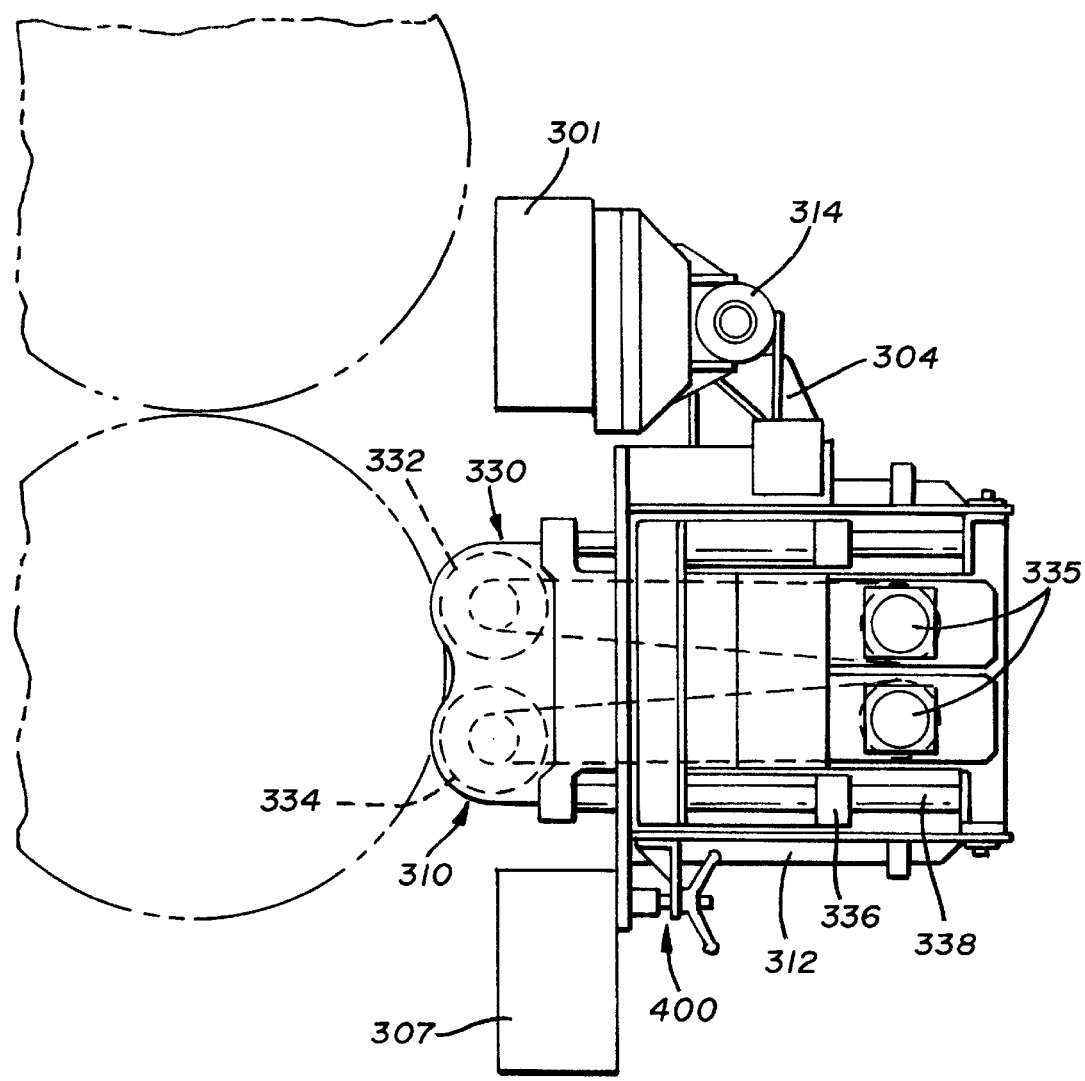
FIG. 12 is a top elevational view of a center grinder according to the present invention depicting the grinder pivotally supported on one frame member and attached to an opposite frame member by a locking assembly.
Figure 13:
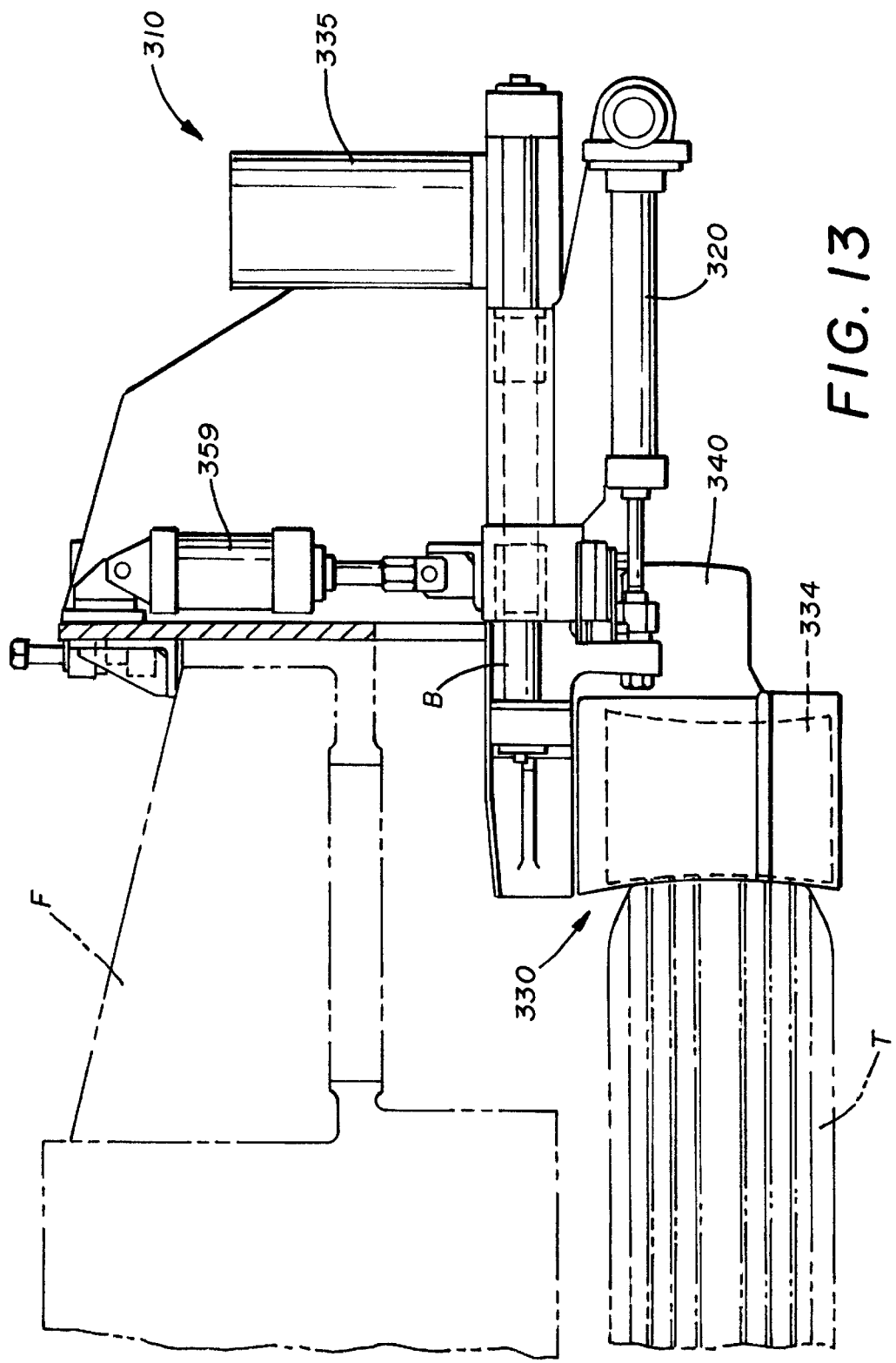
FIG. 13 is a partially sectional side elevational view of the center grinder depicted in FIG. 12.

An alternative grinder 310 similar to grinders 10 and 110 is shown in FIGS. 12 and 13. Grinder 310 includes a carriage 312 supported on a frame F and provided with a pivot 314 that allows radial adjustment of the carriage 312, as well as, swinging the grinder 310, in the radial direction to permit access to the grinding head 330. As in the previous embodiments, the grinding head 330 may have a first grindstone 332 and a second grindstone 334 or a single stone 332. The grindstones 332, 334 are coupled to one or more motors 335, as by a belt B. It will be appreciated that grindstones 332, 334 may be directly driven as previously described.

The grinder 310 shown in FIGS. 12 and 13 is often referred to as a C.A.R.E. (classify and reduce eccentricity) grinder or center grinder, and, due to its location within the frame F, may be held in a generally fixed position relative to the tire T. Thus, it may not be necessary to drive the grindstones 332, 334 of grinder 310 toward or away from the tire T. To that end, as shown, the grinding head 330 may be held in a generally fixed axial position with some manual adjustment allowed by stops 336 located on rails 338. Alternatively, grinder 310 may be driven toward or away from tire T as described in previous embodiments. In addition, grinder 310 may be made movable in the vertical direction as discussed above.

As in the previous embodiments, the grinder 310 may be provided with a first support portion 304 pivotally attached to the first frame member 301 at a pivot 314. A second support portion 306 may extend from the carriage 312 on the side opposite the pivot 314 to attach to a second frame member 307. In further similarity to previous embodiments, the second support portion 306 may be provided with a locking assembly 400. For details of locking assembly 400, reference may be made to locking assemblies described above and depicted in FIGS. 11 and 11A. As shown in FIG. 12, since the center grinder carriage 312 is larger, locking assembly 400 may be supported on a side of the carriage 312. In this embodiment, second support portion 306 is omitted. As described with respect to previous embodiments, the use of two frame members 301, 307 to support carriage 312, provides a more stable and secure support system for grinder 310. The center grinder 310 also benefits in that it is pivotable so that a user can access the grinding head 330 to make repairs or to replace the grindstones 332, 334.

While a full and complete description of the invention has been set forth in accordance with the dictates of the patent statutes, it should be understood that modifications can be resorted to without departing from the spirit hereof or the scope of the appended claims.

What is claimed is:

1. A grinder in a tire uniformity machine having a frame including a first side frame member and a second side frame member, the frame receiving a tire having a central axis for testing, the grinder, comprising: a carriage pivotally attached to the first side frame member and a locking assembly adjacent said carriage and the second side frame member selectively coupling said carriage to the second side frame member when said carriage is in the operating position; a grinding head supported on one end of said carriage, said grinding head having at least one grinding stone and at least one motor coupled to said grinding stone capable of causing rotation thereof.

2. The grinder of claim 1, wherein said locking assembly includes a locking member and a receiver selectively engageable to lock said carriage to said second side frame member, wherein either of said receiver or said locking portion is supported on either of said second side frame members or said carriage.

3. The grinder of claim 2, wherein said locking member is thread ably received within said receiver, said locking member including a threaded portion and a handle facilitating rotation of said threaded portion.

4. The grinder of claim 1, wherein said locking assembly includes a latch assembly having a handle portion operatively coupled to a locking member, wherein said locking member selectively applies a clamping force to aid carriage and said frame, whereby application of said clamping force holds said carriage against said frame.

5. The grinder of claim 4, wherein said locking member supports a caster, wherein said clamping force is applied via said caster, said caster being oriented to allow vertical movement of said carriage.

6. The grinder of claim 5, wherein said carriage is movable in the vertical direction, the grinder further comprising a vertical locking assembly including a brake assembly supported on either of said carriage or said side frame members and a vertical locking member supported on the opposite of said carriage or side frame members, wherein said vertical member is received within said braking assembly and said braking assembly selectively applies a braking force thereto to fix the vertical position of said carriage relative to said side frame members.

7. The grinder of claim 6, wherein said brake assembly includes a fail-safe brake.

8. The grinder of claim 6, wherein said carriage is coupled to at least one of said side frame members by a linear rail adapted to allow movement of said carriage in the vertical direction.

9. The grinder of claim 6 further comprising an actuator acting on said carriage to cause vertical movement thereof.

10. The grinder of claim 9, wherein said actuator is in communication with a controller providing position feedback thereto, whereby the vertical position of the grinder is adjusted in an automated fashion.

11. The grinder of claim 1, wherein said carriage includes a first support portion and a second support portion extending outward from opposite sides of said carriage toward said first and second side members, wherein said first support portion is pivotally attached to said first frame member and said second support portion faces said second frame member when said carriage is in an operating position, wherein said locking assembly secures said second support portion to said second side frame member of the frame.

12. The grinder of claim 11 further comprising a stop located on an end of said second support portion, wherein a portion of said stop extends outward of a plane defined by a side of the second frame member; a bracket extending from said second side frame member opposite at least a portion of said stop, wherein said locking assembly couples said portion of said stop to said bracket to hold the second support portion against the second side frame member.

13. The grinder of claim 12 further comprising a bumper located between the second side frame member and said stop.

14. The grinder of claim 11, further comprising an arm supported on said carriage, said grinding head being supported on said arm wherein said grinding head is pivotally mounted on said arm on an axis, said grinder further comprising a tilt adjustor supported on said arm having a motor assembly operatively coupled to said grinding head, wherein activation of said motor assembly causes the grinding head to pivot about said axis.

15. The grinder of claim 14 further comprising a brake assembly having a brake operable to hold said grinder head in a selected position.

16. A tilt adjustor in a tire uniformity machine that tests a tire having a circumference, the tire uniformity machine having a grinding head supported on an arm at a pivot and pivotable about a pivot axis extending through the pivot parallel to a tangent of the circumference of the tire, the tilt adjustor comprising: a motor assembly supported on the arm and operatively coupled to the grinding head, whereby activation of said motor assembly causes the grinding head to pivot about the pivot axis.

17. The tilt adjustor of claim 16 wherein the pivot includes at least one pin about which the grinding head pivots, and said motor assembly includes a motor having a motor shaft; wherein said pin and said motor shaft are coupled by a coupler.

18. The tilt adjuster of claim 17, wherein said coupler is a belt having a first end operatively attached to said motor shaft and a second end operatively attached to said pin.

19. The tilt adjustor of claim 18 wherein said belt is coupled at each of said ends by a pair of pulleys mounted respectively on said pin and shaft.

20. The tilt adjustor of claim 17 wherein said brake assembly further includes a brake member extending from said grinding head to said brake, wherein said brake applies the braking force to a portion of said brake member.

21. The tilt adjuster of claim 20, wherein said brake member is coupled such that said brake member pivots with said grinding head; wherein said brake member includes an extension extending radially outwardly from said brake member; said braking force being applied to said extension such that braking force is applied to multiple points on said extension corresponding to different degrees of tilt of said grinding head.

22. The tilt adjustor of claim 20 wherein said extension has an arcuate edge having a constant radius with respect to the pivot axis of the grinding head.

23. The tilt adjuster of claim 16 wherein said coupler is located adjacent to an outside surface of said arm.

24. The tilt adjuster of claim 16 wherein said arm has a pair of spaced members, the grinding head being mounted between the pair of spaced members, said motor assembly being mounted on at least one of said members and spaced from said pivot, wherein said motor assembly is coupled to said grinding head by a coupler extending from said motor to the grinding head outside of one of said spaced members.

25. The tilt adjuster of claim 24 wherein said motor is mounted on an inside surface of one of said spaced members; wherein one of said spaced members defines a bore for receiving a motor shaft extending from said motor outside of said spaced member, said shaft being coupled to said grinding head by said coupler.

26. The tilt adjustor of claim 16 further comprising a brake assembly operable to hold the grinder head in a selected position; said brake assembly including a brake selectively coupled to said grinding head whereby upon coupling said brake assembly applies a braking force to the grinding head.

* * * * *